United States Patent [19]

Shimatake et al.

[11] 4,267,424
[45] May 12, 1981

[54] SPOT WELDING MACHINE FOR HEAVY-DUTY OPERATIONS ON SURFACE CONTOURED WORKPIECES

[75] Inventors: Hirokazu Shimatake, Yamato; Shuichi Ogawa, Toyko; Shigeru Uchida, Tokyo; Ryuichi Nara, Tokyo; Haruyoshi Takagishi, Yamato, all of Japan

[73] Assignee: Nissan Motor Company, Limited, Yokohama, Japan

[21] Appl. No.: 39,893

[22] Filed: May 17, 1979

[30] Foreign Application Priority Data

May 22, 1978 [JP] Japan .................................. 53-60725
May 22, 1978 [JP] Japan .................................. 53-60726

[51] Int. Cl.$^3$ ........................ B23K 11/36; B23K 37/02
[52] U.S. Cl. ............................... 219/86.41; 219/86.25; 219/125.1; 228/45; 266/73
[58] Field of Search .................. 219/86.25, 86.33, 86.7, 219/86.9, 87, 125.1; 228/45; 266/72, 73

[56] References Cited

U.S. PATENT DOCUMENTS

| | | | |
|---|---|---|---|
| 2,313,789 | 3/1943 | Weightman | 219/86.25 |
| 3,031,566 | 4/1962 | Wuesthoff | 219/125.1 |
| 3,665,148 | 5/1972 | Yasenchak et al. | 219/86.33 X |
| 4,014,495 | 3/1977 | Oda et al. | 266/72 X |
| 4,121,746 | 10/1978 | Frohlich et al. | 228/45 X |

FOREIGN PATENT DOCUMENTS 2338617 12/1974 Fed. Rep. of Germany ........ 219/86.25

OTHER PUBLICATIONS

*Machinery and Production Engineering*; Jun. 21, 1978 pp. 34-36; "Time To Take Notice As Robots March On."
*Welding Journal;* vol. 58, No. 1, Jan. 1979, pp. 26-29; "Arc-Welding Times Slashed By Robot at AiRearch," by William Hosier.

*Primary Examiner*—Thomas J. Kozma
*Assistant Examiner*—Keith E. George
*Attorney, Agent, or Firm*—Lowe, King, Price & Becker

[57] ABSTRACT

A spot welding machine comprising a pair of vertically spaced-apart guide rails rigidly supported on a framed structure a distance from the ground, a slide member slidably mounted on the guide rails, and a robot arm structure having a housing pivoted at an upper pivot point of the slide member, and outer and inner shafts axially movable as a single piece along the longitudinal axis of the housing, the inner shaft being rotatable about the longitudinal housing about which the inner shaft is rotatable. An electrode holder is attached to the forward end of the housing for unitary axial movement with the outer and inner shafts and for unitary rotation with the inner shaft to vertically swing an electrode tip attached thereto. A fluid operated telescopic cylinder is pivotally connected between the lower pivot of the slide member and a forward end portion of the housing for pivoting the robot arm structure at a desired angular position. A backing electrode is provided on the ground to mount a workpiece to which the electrode tip is addressed in response to a set of instruction data to make pressure contact therewith.

7 Claims, 19 Drawing Figures

SPOT WELDING MACHINE FOR HEAVY-DUTY OPERATIONS ON SURFACE CONTOURED WORKPIECES

BACKGROUND OF THE INVENTION

The present invention relates to spot welding machines, and in particular to such a machine capable of heavy-duty spot welding operations on surface contoured workpieces in response to a set of instruction data.

In automobile manufacturing plants, it is customary to produce a single model of cars on a single production line since there do not exist multi-purpose machine tools which make it possible to produce different models on the same production line. It is desirable however to mass-produce a variety of models of cars on a single production line in terms of efficiency, space savings and equipment cost.

Attempts have hitherto been made to employ industrial robot systems because of their capability to repeatedly position an object according to a prescribed pattern under the direction of instruction data including tool position data and operating speed.

Conventional robot systems comprise a main body installed on the ground and an arm pivoted at one end to the main body for holding a tool at the other end. In some machining operations such as spot welding, a substantial amount of force is applied to a workpiece and the resulting reaction force must be borne by the entire structure. However, the conventional robot system is not capable of bearing such reaction force and deformation tends to occur.

To avoid such deformation conventional automatic spot welding machines are provided with upper and lower arms in an X-shaped or C-shaped configuration to distribute the reaction force components between the upper and lower arms. However, large sized workpieces would require the machine to extend its arm a substantial distance from its standing position. Furthermore, the conventional machine employs upper and lower electrode tips between which the workpiece is pressure-contacted and current is passed between the electrode tips. Therefore, when the machine arm extends a substantial distance from its standing position, the secondary impedance of the power transformer would increase requiring additional electrical power and resulting in non-uniform spot welds.

SUMMARY OF THE INVENTION

The invention contemplates the use of a pair of vertically spaced parallel guide rails mounted on a rigid frame structure. The spot welder comprises a robot arm including a housing, an outer and inner shaft axially movable as one piece with the inner shaft being rotatable about its axis, an electrode holder mounted on a horizontal pivot shaft rotatably connected to a forward end of the inner shaft, and fluid operated cylinders for actuating the moving parts of the robot arm to permit it to assume a desired angular position. An upper end of the robot arm is pivoted to an upper end of a slide member which is slidably mounted on the guide rails. A fluid operated telescoping cylinder is connected between a lower end portion of the robot arm and a lower pivot point of the slide member. During spot welding reaction force is transmitted through the longitudinal axis of the robot arm. Part of the transmitted force is conveyed through the upper pivot point of the slide member to the upper guide rail, while the remainder is conveyed through the telescoping cylinder to the lower pivot point of the slide member and thence to the lower guide rail, whereby the reaction force is transmitted to the rigid frame structure. The forward end of the robot arm is provided with a brake or frictional means which firmly holds the electrode holder, so that the latter is not subject to bending or deformation.

The invention further contemplates the use of an additional electrode holder which may be mounted on the same robot arm structure in parallel with the first electrode holder to pass welding current between the electrode tips mounted on the holders through the workpiece and a backing electrode. The additional electrode holder may be mounted on an additional robot arm structure which is mounted opposite to the first robot arm structure.

The backing electrode preferably comprises a plurality of angularly spaced-apart metal members each having its edge contoured in conformity with the lower surface of the particular workpiece. The metal members are mounted on a single horizontal rotary shaft which is driven by a fluid operated cylinder to position a particular metal member to an upright position to effect spot welding operation on different types of workpiece.

An object of the invention is therefore to provide a heavy-duty spot welding machine which is capable of welding a large-sized surface contoured workpiece.

Another object of the invention is to provide a spot welding machine capable of spot welding two locations simultaneously by pressure contacting two electrode tips with the workpiece and passing a current between the electrode tips through the workpiece and a backing electrode on which the workpiece is placed.

A further object of the invention is to provide a spot welding machine which is capable of spot welding workpieces having different surface contours on the same production line.

BRIEF DESCRIPTION OF THE DRAWINGS

The invention will be further described by way of example with reference to the accompanying drawings, in which:

FIG. 1b is a partial plan view of the spot welding machine of FIG. 1a;

DETAILED DESCRIPTION

Figure 1A:
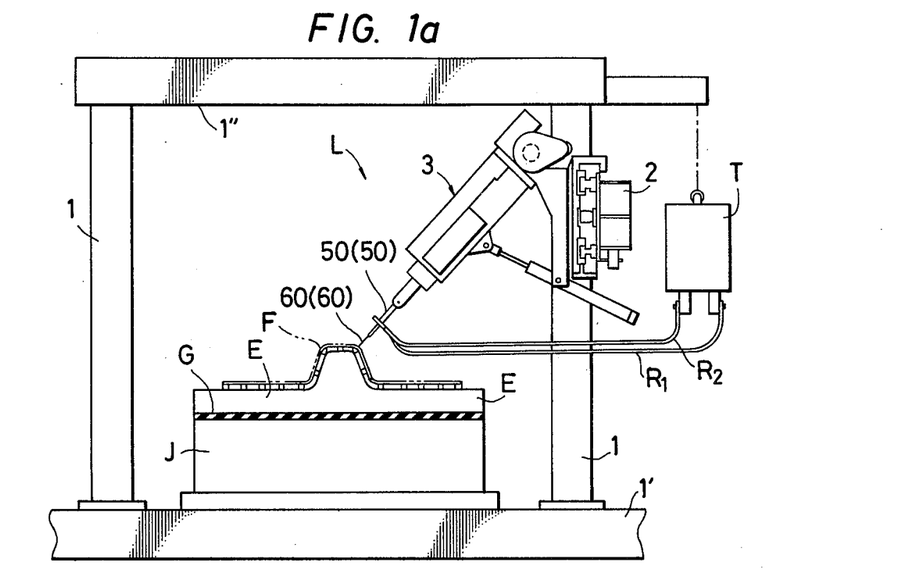
FIG. 1a is an end view of a spot welding machine of the invention.
Figure 1B:
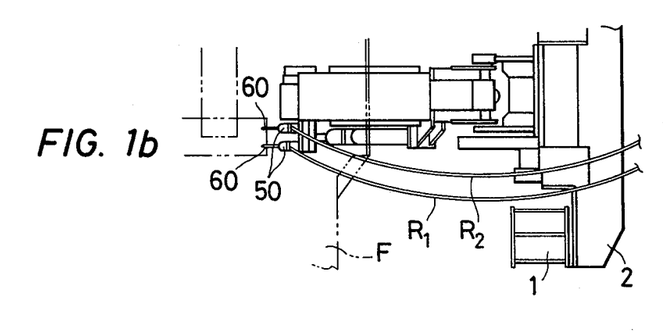
Figure 1C:
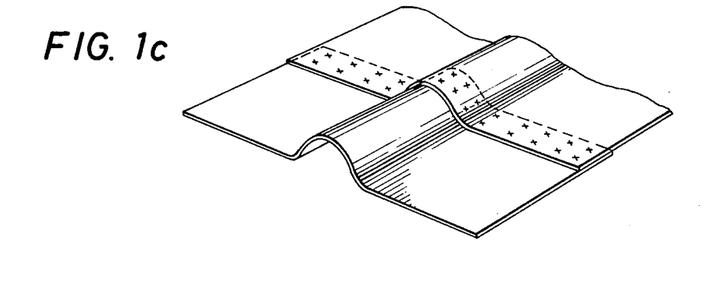
FIG. 1c is a perspective view of a workpiece showing a series of spot welds.

Referring now to FIGS. 1a, 1b and 1c, numerals 1, 1 designate columns or guide supports erected on the ground 1' by the side of an automobile assembly line L, on which a car floor F is successively placed for welding operations. The vertical supports 1, 1 are connected by a horizontal beam 1" spaced a distance from the ground 1'. A pair of vertically spaced parallel, upper and lower guide rails 5a and 5b is secured to a reinforced horizontal beam 2 mounted on the vertical supports 1. A slide member 4 is slidably mounted on the guide rails 5a, 5b. On an upper pivot point 10 of the slide member 4 is pivoted an upper end of a spot welding robot arm structure 3, and between a lower pivot 12 of the member 4 and a pivot 14 of the robot arm 3 is connected a fluid operated telescoping means or cylinder 11 for pivoting the robot arm 3 at a desired angular position to position a pair of electrode holders, or fluid-operated gun cylinders 50, 50 on the workpiece F. The robot arm 3 is also driven along the guide rails to take optimum work positions. FT is a hump formed on the car floor F to provide a downwardly open channel and E is a backing electrode mounted on an insulator G placed on a base J.

Figure 2:
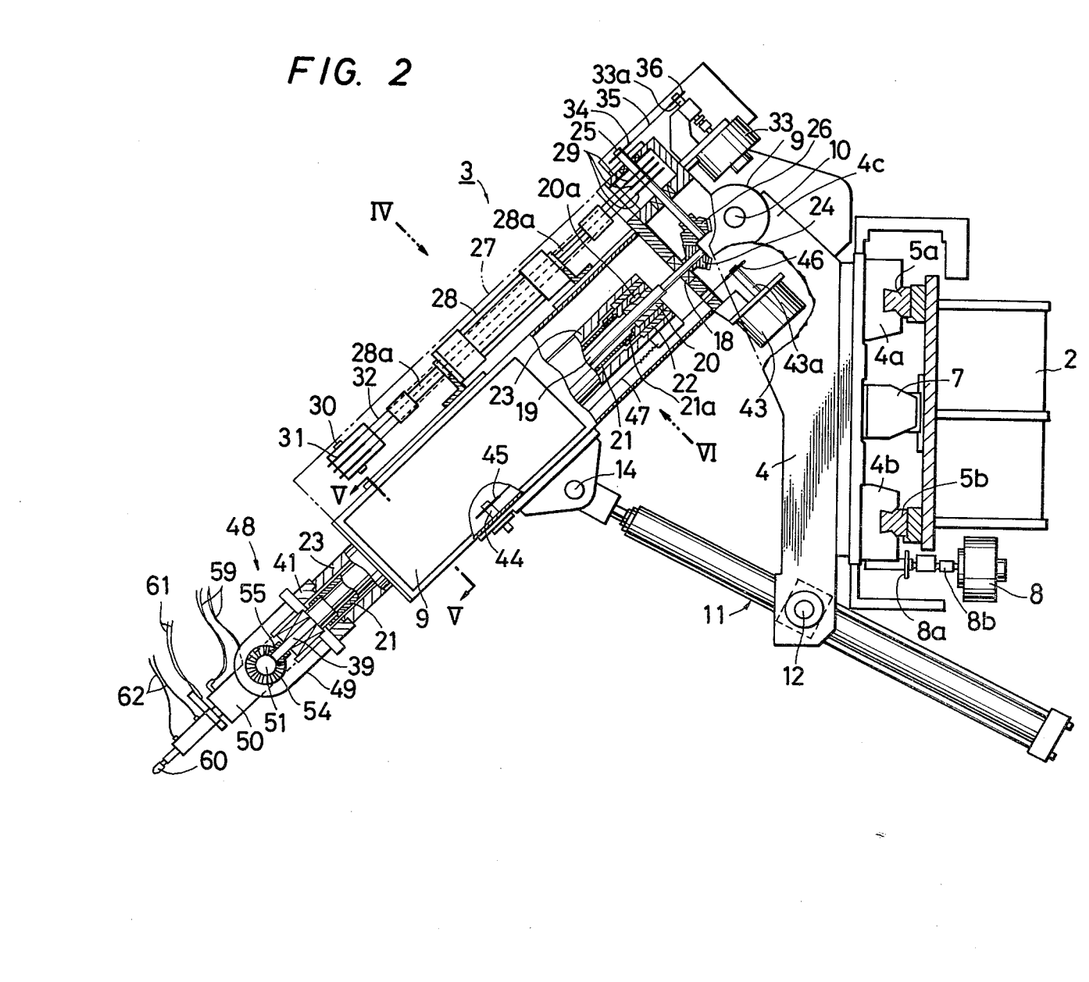
FIG. 2 is a partially broken, side elevational view of the robot arm structure of FIG. 1.
Figure 3:
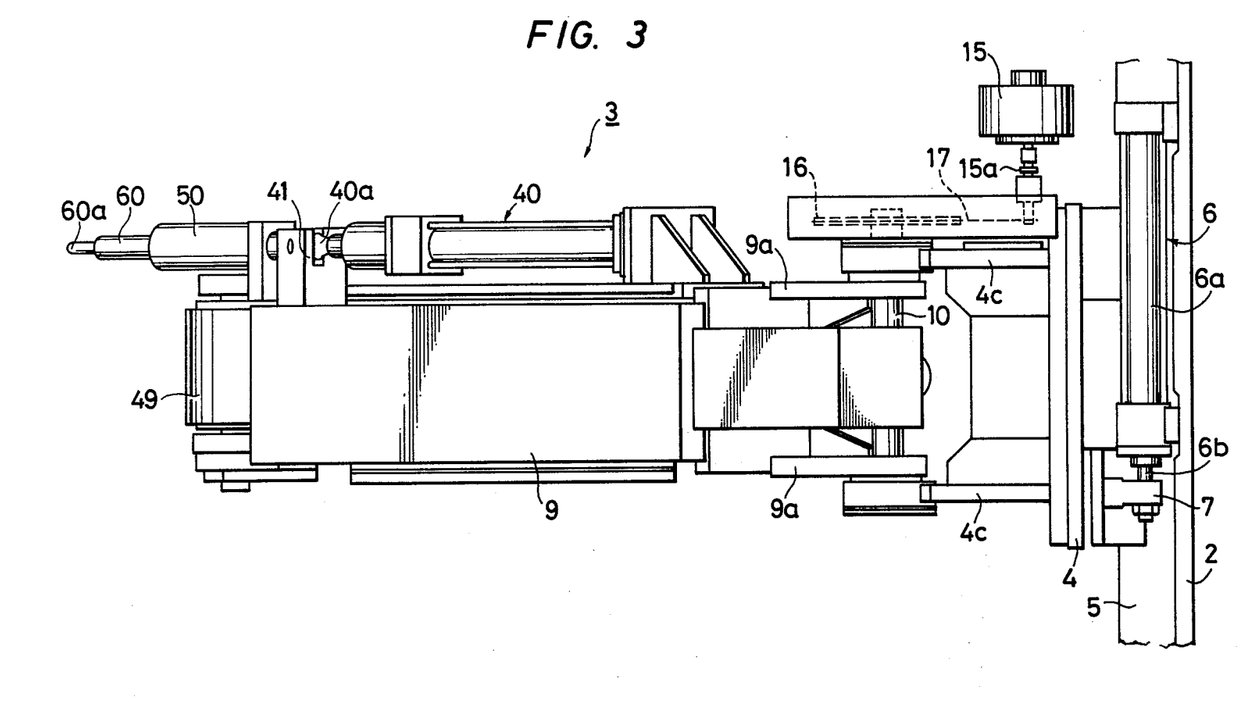
FIG. 3 is a plan view of the robot arm of FIG. 1.

FIGS. 2 through 7 illustrate the details of the robot arm structure 3. In FIGS. 2 and 3, the slide member 4 is shown as including a pair of legs 4a, 4b slidably secured to the guide rails 5a and 5b, respectively, and a bracket 7 to which is secured the piston rod 6b of a fluid operated telescoping cylinder 6 (see FIG. 3), the cylinder housing 6a thereof being connected to the beam 2 for purposes of moving the robot arm structure 3 along the guide rails. A position translating encoder 8 (FIG. 2) is secured to the beam 2 for detecting the position of the slide member 4 by converting the horizontal displacement of the slide member 4 with respect to a reference point into the angular position of a detector unit 8b by means of a sprocket 8a and a chain (not shown). The arrangement of the sprocket 8a and chain is of the same construction as an arrangement shown in FIG. 6 which will be described later.

The slide member 4 is also provided with a pair of yokes 4c, 4c which pivotally secure the shaft 10 on which flanges 9a, 9a of a robot arm housing 9 are mounted (FIG. 3). The angular position of the robot arm 3 is detected by a position encoder 15 having a detector shaft 15a which is coupled by means of a chain belt 17 and a sprocket 16 secured to the shaft 10.

The robot arm housing 9 includes, as shown in FIG. 2, a bearing 18 which rotatably supports a spline shaft 19, an inner cylindrical shaft 21 and an outer cylindrical shaft 23, each being mounted coaxially with the spline shaft 19. Fixed to the rearward end of the spline shaft 19 is a bevel gear 24 in mesh with another bevel gear 26 secured to a rotary shaft 25 extending at right angles to the spline shaft 19, so that the latter is driven by the rotary shaft 25. A fluid operated telescoping cylinder 28 is secured to the robot arm housing 9 and enclosed by a cover 27, in phantom line, to drive the rotary shaft 25. The cylinder 28 is provided with a pair of oppositely reciprocating piston rods 28a, each end of which is linked to each end of a chain belt 32 which is looped around a sprocket 29 fixed to the rotary shaft 25 and around a sprocket 31 rotatably mounted on a shaft 30 pivoted to the forward end of the robot arm housing 9. The reciprocating motion of the piston rods 28a in opposite directions is transmitted to the rotary shaft 25 via the chain and sprocket arrangement. Numeral 33 designates a position encoder for detecting the angular position of the rotary shaft 25, that is, the angular position of the gun cylinders 50, 50 through the rotation of a detector shaft 33a by means of a chain belt 35 in mesh with a sprocket 34 on the rotary shaft 25 and another sprocket 36 on the detector shaft 33a.

Figure 4:
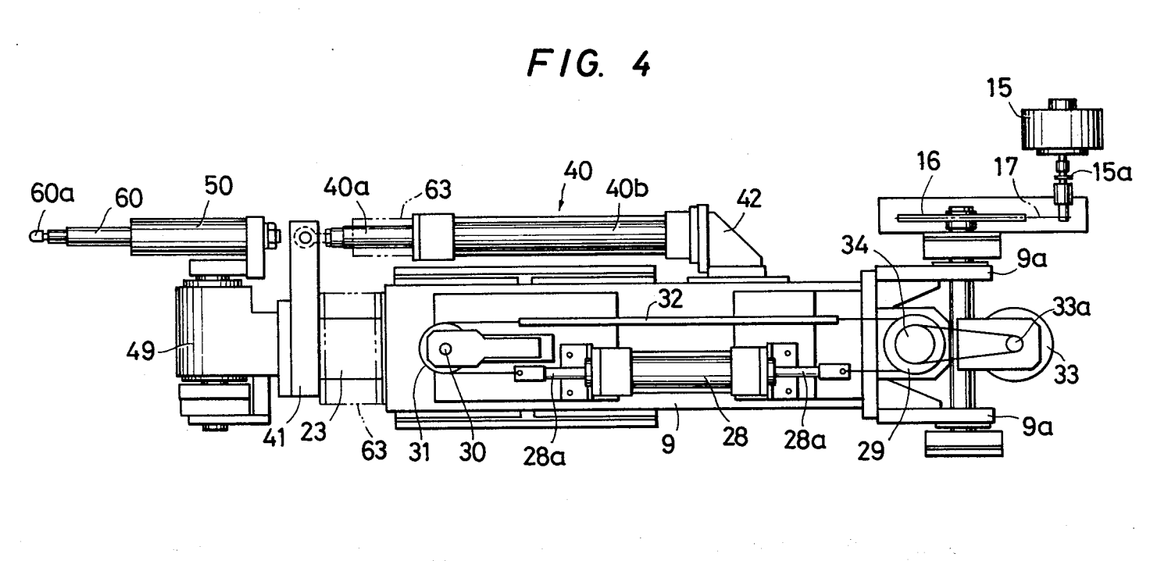
FIG. 4 is a side view of the robot arm of FIG. 2 as viewed in the direction indicated by the arrow IV of FIG. 2.
Figure 5:
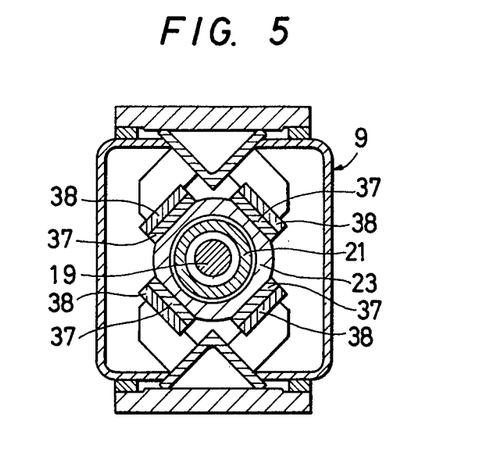
FIG. 5 is a cross-sectional view taken along the lines V—V of FIG. 2.
Figure 6:
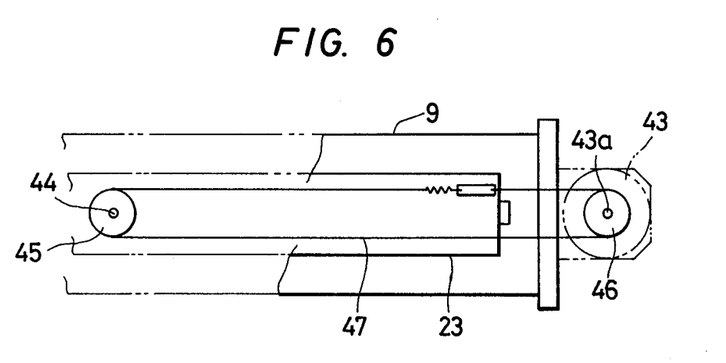
FIG. 6 is a side view of the robot arm of FIG. 2 as viewed in the direction indicated by the arrow VI of FIG. 2.

The upper end portion of the spline shaft 19 is slidably spline-connected with a hub 20 which is connected by a key 20a to a sleeve 21a of the inner shaft 21. When the spline shaft 19 turns, the inner shaft 21 also turns inside a bushing 22 and moves in the axial direction together with the outer shaft 23. As illustrated in FIG. 5, the outer shaft 23 is provided with oppositely facing sliding members 37 spaced at 90 degrees from each other which are slidably in engagement with sliding member 38 secured to the inner walls of the robot arm housing 9, so that the outer shaft 23 is not allowed to rotate about its longitudinal axis. The forward ends of the inner and outer shafts extend beyond the forward end wall of the housing 9, the end of the inner shaft 21 being secured to a spindle 39 as best seen in FIG. 2 and the end of the outer cylinder 23 secured to a connecting arm 41 fixed to a piston rod 40a of a fluid operated telescoping cylinder 40 which is shown in FIG. 4. The cylinder housing 40b of the cylinder 40 is secured to the housing 9 by a bracket 42 so that the cylinder 40 is in parallel to the longitudinal axis of the inner and outer shafts 21, 23. The cylinder 40 thus causes the connecting arm 41 and the inner and outer shafts 21, 23 to move axially for purposes of lengthening and shortening the extent of the gun cylinder 50 beyond the forward end of the housing 9. The axial position of the gun cylinder 50 is detected by a position encoder 43 which, shown in FIGS. 2 and 6, converts the axial movement of the outer shaft 23 into a rotation of a detector shaft 43a by means of a chain belt 47 looped around a sprocket 45 mounted on a shaft 44 pivoted to the housing 9 and a sprocket 46 fixed to the detector shaft 43a.

Figure 7:
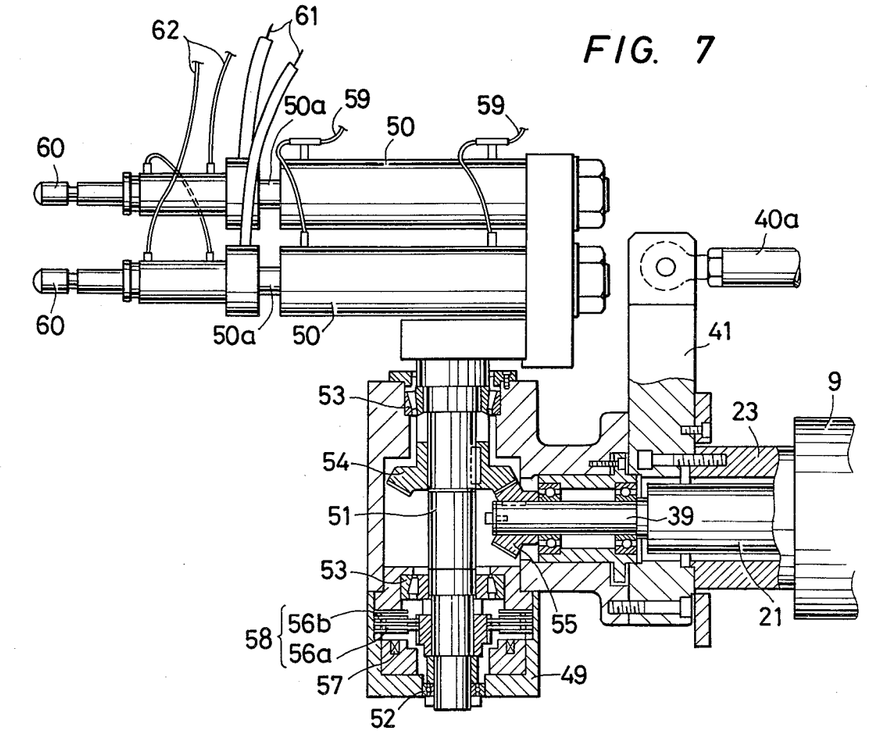
FIG. 7 is an enlarged, partially broken view of the electrode holder of the robot arm structure.

The spindle 39, which is attached to the forward end of the inner shaft 21, is enclosed by a housing 49 with its bevel gear 55 in mesh with a bevel gear 54 mounted on a horizontal pivot shaft 51 rotatably secured to the housing 49 to constitute a wrist portion 48 of the robot arm structure as best seen from FIG. 7. The gun cylinder 50 is secured to the pivot shaft 51, so that by rotation of the inner shaft 21 the gun cylinder 50 is caused to swing on a vertical plane. An electromagnetic brake 58 is mounted in the housing 49 to hold the pivot shaft 51 in position by reason of friction between inner discs 56a fixed to the shaft 51 and outer discs 56b fixed to the housing 49 when an electromagnet 57 is energized. The gun cylinders 50, 50 are provided with air supply hoses 59, 59 to respond to controlled air pressure to extend or retract their piston rods 50a, 50a. To the forward end of each piston rod 50a is attached an electrode tip 60. A welding cable R1 is connected from a transformer T to one electrode tip 60, another cable R2 connecting the transformer to another electrode tip 60. A pair of water supply hoses 62 is connected to the electrode tips 60, 60 to pass cooling water therethrough.

The fluid operated cylinders 6, 11, 28 and 40 are each provided with a fluid supply conduit for hydraulically control their piston rods. Numeral 63 in FIG. 4 designates a boot to prevent dust entry.

Figure 8:
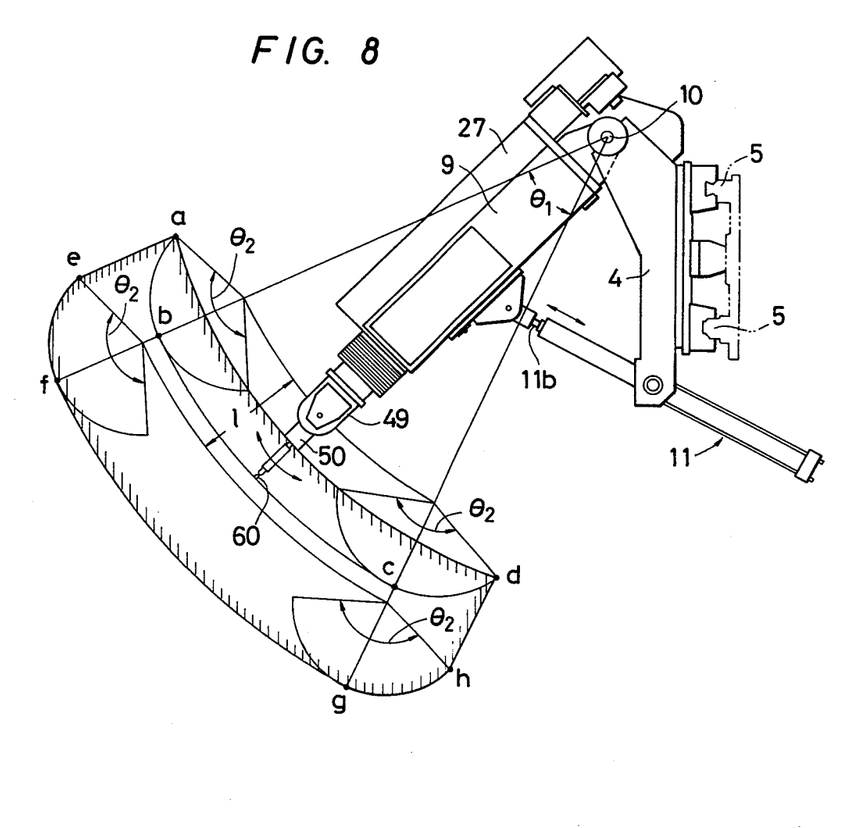
FIG. 8 is an explanatory diagram illustrating the range of working area of the electrode tip.

The electrode tips 60, 60 can thus be moved to any position by hydraulically controlling the telescoping cylinders 6, 11, 28 and 40, respectively. More specifically, the cylinder 6 (FIG. 3) extends or retracts its piston rod 6b causing the slide member 4 to move along the guide rails 5a, 5b, the cylinder 11 (FIG. 2) controlling the angular position of the robot arm 3. As shown in FIG. 8, the robot arm 3 takes an angular position through an angle $\theta$ in response to an axial length of the piston rod of the cylinder 11. The cylinder 28 (FIG. 2) rotates the sprocket 29 and the rotary shaft 25 by the chain belt 32, and this rotation is communicated via the bevel gear 26, bevel gear 24, spline shaft 19, inner shaft 21, spindle 39, bevel gear 55 and bevel gear 54 to the pivot shaft 51, causing the gun cylinders 50, 50 to swing through an angle $\theta 2$. This permits the electrode tips 60a, 60a to take a desired position within an area defined by points a, b, c and d. In addition, the hydraulic controlled cylinder 40 (FIGS. 3 and 4) causes the connecting arm 41 and therefore the wrist housing 49 to axially extend or retract with respect to the housing 9 to allow the electrode tips 60a, 60a to travel a distance l, so that it takes a desired position within an extended area defined by points a, e, f, g, h and d. At this time the inner and outer shafts 21, 23 will also axially move as a single piece with the slide members 37 sliding along the slide plates 38 of the robot housing 9, whereby the outer shaft 23 is prevented from rotating about its axis. The gun cylinders 50, 50 provide pressure to the electrode tips 60a, 60a against the surface of the workpiece F to achieve a pressure contact therewith.

The electrode tips 60a, 60a can thus be positioned repeatedly at specified locations of the workpiece automatically with the use of a predetermined program stored in a computer memory.

Figure 9:
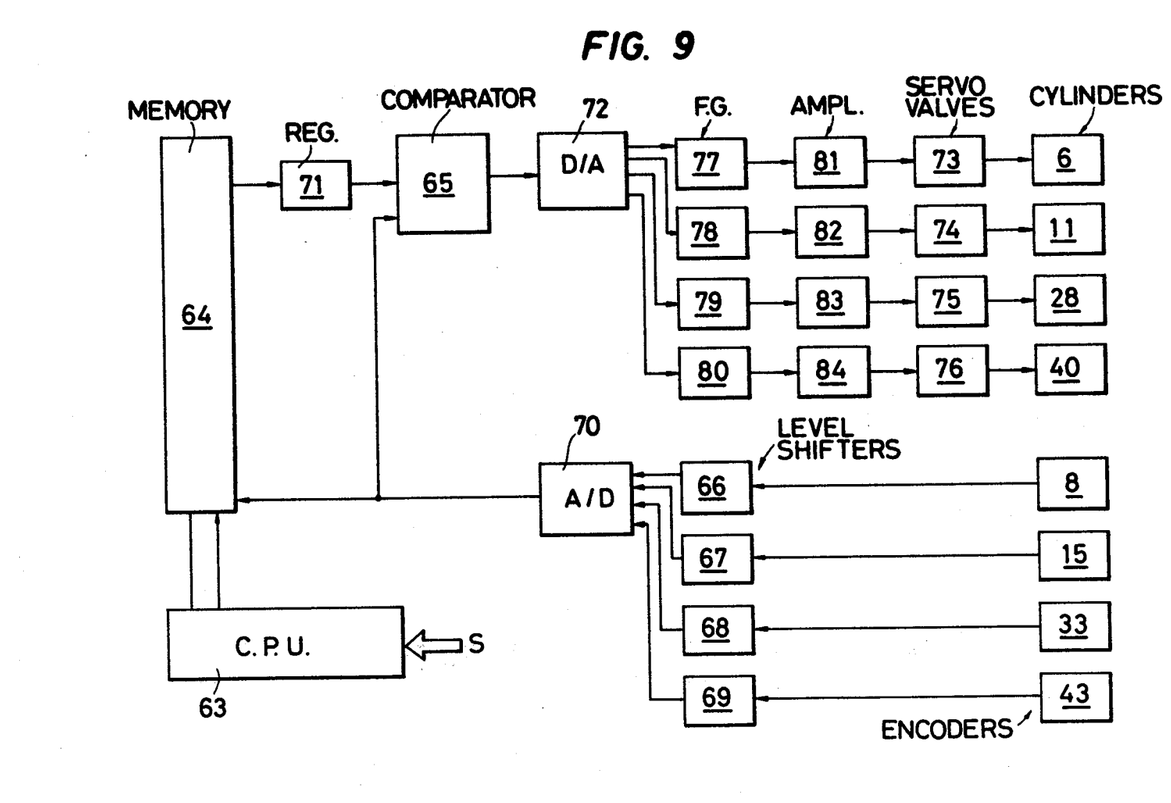
FIG. 9 is a schematic block diagram of an electronic control system of the robot system.

FIG. 9 shows a block diagram of the control unit of the spot welder robot system. The position encoders 8, 15, 33 and 43 deliver position data to the associated fluid-operated cylinders through a feedback control loop. Numeral 63 is a central processor unit to which control data S is supplied. Encoders 8, 15, 33 and 43 feed positional data to associated level shifters 66, 57, 68 and 69 respectively and thence to an analog-to-digital converter 70. The latter provides digital position signals to an input of a digital comparator 65 on the one hand and on the other to a core memory 64. The control system is initially instructed to record position data by feeding a set of input data into the core memory 64. Responsive to the input data the cylinders 6, 11, 28 and 40 are actuated resulting in the generation of actual positional data from the associated encoders. The actual position data is transmitted via associated level shifters to an analog-to-digital converter 70 and applied to the digital comparator 65 wherein the input signal is compared with the data stored in a register file 71 retrieved from the memory 64. The comparator 65 feeds a signal representing the deviation of the position of the respective cylinder from the desired position and continues to feed that signal until the deviation is reduced to zero. When this occurs, digital signals from the converter 70 represent the desired positions and are applied to the memory 64 to be recorded therein as a set of instruction data for a particular working position with which the encoder signals are compared in subsequent welding operations. This process is repeated for each welding spot to record a plurality of sets of instruction data to effect a series of welding operations on the car floor F.

Figures 10A, 10B:
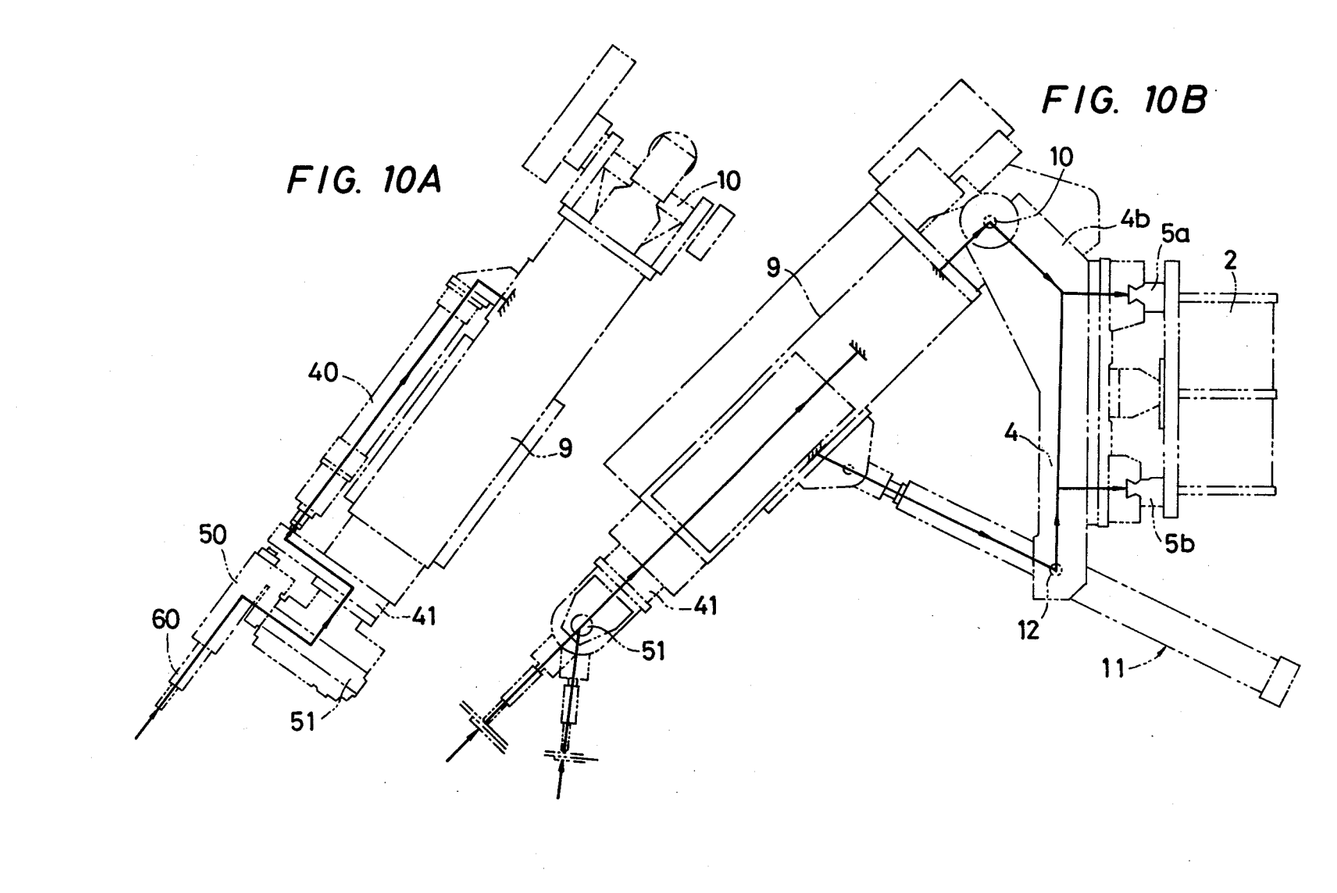
FIGS. 10a and 10b are explanatory diagrams illustrating the route of reaction forces transmitted through the robot arm to the frame structure.

After the electrode tips 60, 60 are automatically set into a desired position, working fluid is supplied to the gun cylinders 50, 50 to enable them to apply pressure to the electrode tips, 60, 60 against the surface of the workpiece F. Electric current is then passed between the electrode tips 60, 60 through a backing electrode located below the workpiece to effect spot welding. The reaction force exerted on the electrode tips 60, 60 is communicated, as shown in FIGS. 10a and 10b, to the gun cylinders 50, 50, then to the pivot shaft 51, the connecting arm 41 and the cylinder 40, to the robot arm housing 9. The reaction force so communicated to the arm 9 is further transmitted to the reinforced beam 2 through the upper pivot shaft 10 to the guide rail 5a on the one hand and through the lower pivot point 12 to the guide rail 5b on the other hand. Therefore, it is totally unnecessary to bear the reaction force by the robot arm housing 9 alone. This produces the effect of practically increasing the strength of the welding machine, making possible spot welding using a robot system which has hitherto been impossible.

Figures 11, 12:
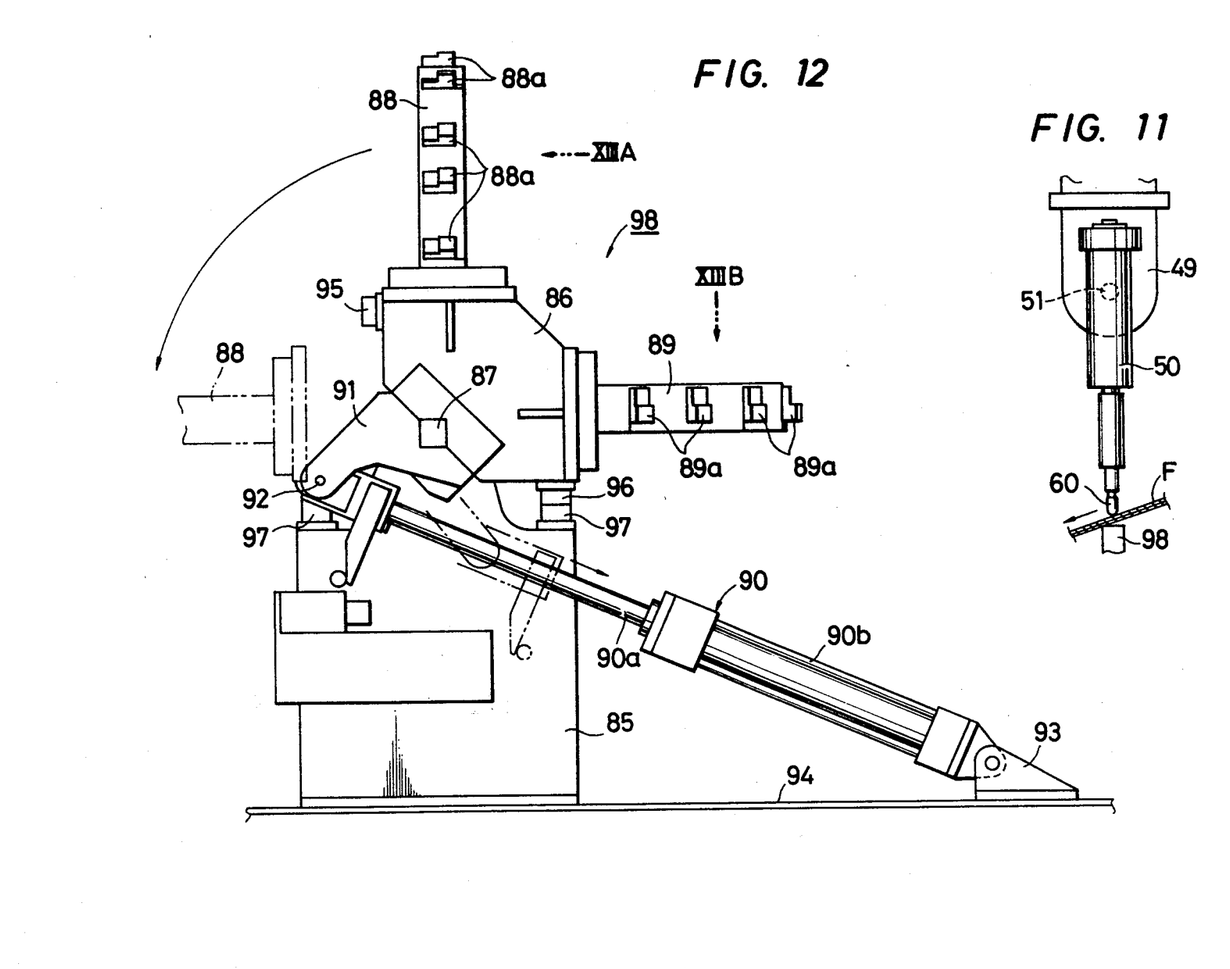
FIG. 11 is an illustration of the robot arm relative to an inclined working surface.
FIG. 12 is an end view of a backing electrode unit.

If the surface of the workpiece F is not perpendicular to the electrode tip 60, as illustrated in FIG. 11, as a result of irregular contour of the workpiece, the pivot shaft 51 of the wrist portion, being firmly held in position by means of the electromagnetic brake 58, will not cause the electrode tip 60 to slip off the surface of the workpiece, and in addition, the outer shaft 23, being prevented from rotation by means of slide members 37, will not cause the electrode tip 60 to rotate about its axis.

Figure 13A:
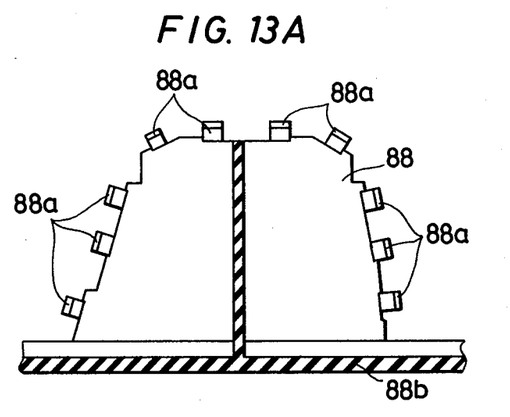
FIGS. 13a and 13b are side views of the electrode unit viewed respectively in the directions indicated by the arrows XIIIA and XIIIB of FIG. 12.
Figure 13B:
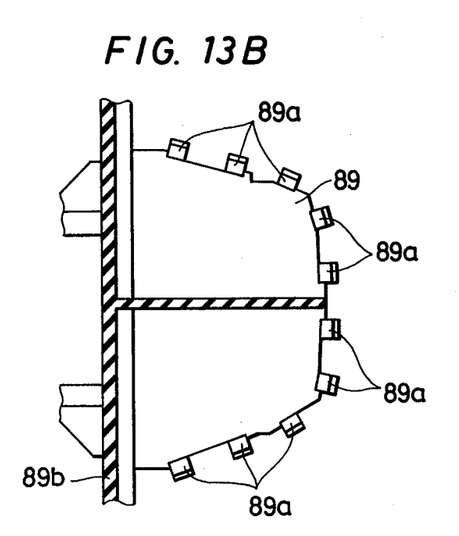

The welding spots may differ in location and size between car floors of different type. In such situations it is necessary to change the backing electrode in accordance with different car floors. FIGS. 12 and 13 show a backing electrode unit 98 designed to serve this purpose. Numeral 85 is a base and 86, an electrode support which is rotatable about a horizontal rotary shaft 87. On the support 86 are mounted angularly spaced apart backing electrodes 88 and 89 whose side configurations are shown in FIGS. 13a and 13b, respectively. The electrode support 86 is insulated from electrodes 88 and 89 by insulators 88b and 89b, respectively. These backing electrodes 88 and 89 each have particular contours to conform to the contour of different car floors, and each electrode is so inclined as to abut the lower surface contour of the channel portion of the car floor. Numeral 90 is a hydraulic cylinder having a piston rod 90a with its top end pivoted to a bracket 91 secured to shaft 87, and a cylinder housing 90b having its bottom end pivoted to a bracket 93 on a base plate 94. When the piston rod 90a extends, as shown in FIG. 12, the support 86 turns counterclockwise to bring the electrode 88 to the top position, and when the piston rod retracts, the support is turned to a position indicated by broken lines, bringing the electrode 89 to the top position. Numerals 95, 96 and 97 designate spacers to determine the position of the support.

With the car floor F being pressure-contacted between the paired electrode tips 60, 60 and the associated backing electrode, a welding current is supplied from a first terminal of the transformer T to one electrode tip 60, then to the workpiece, and through the backing electrode and the other electrode tip 60, and back to the second terminal of the transformer, whereby spot welding is effected simultaneously at two locations as illustrated in FIG. 1c. This arrangement thus eliminates the need for connecting a cable from the transformer to the backing electrode.

Figure 14:
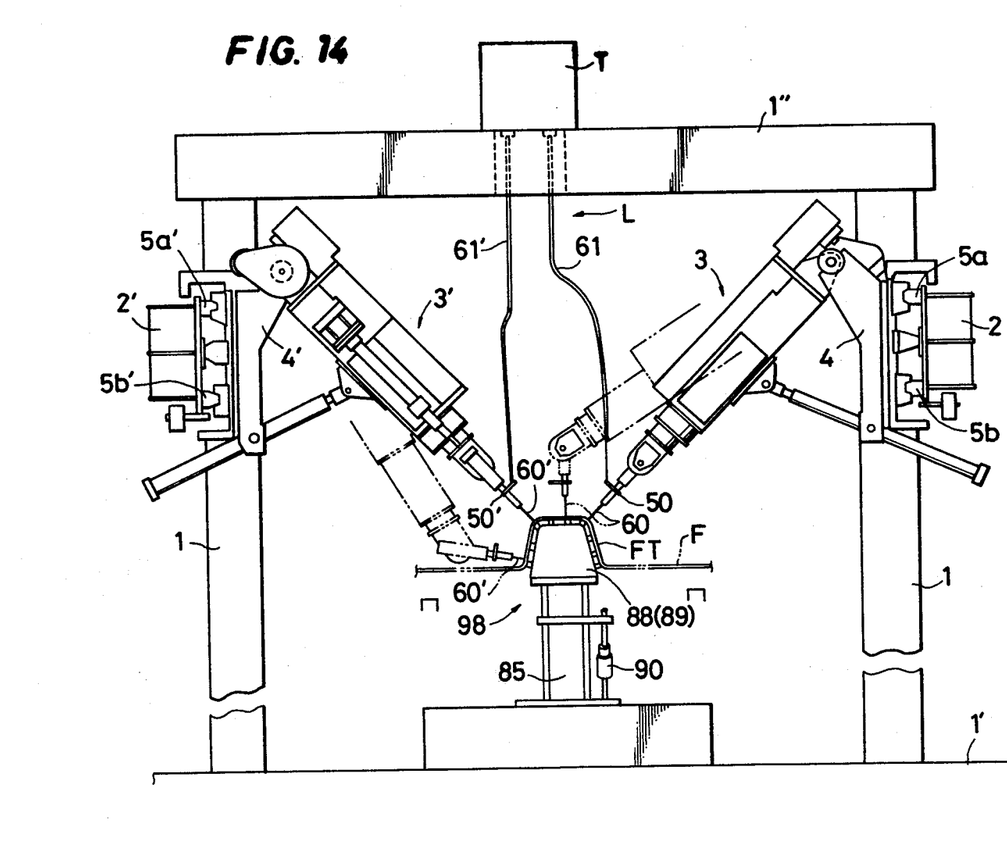
FIG. 14 is an end view of an alternative embodiment of the invention using a plurality of robot arms positioned on opposite sides of a production line.

An alternative embodiment of the present invention is illustrated in FIG. 14 in which a second robot arm structure 3', identical in construction to the robot arm structure 3, is mounted on the vertical support 1 opposite to the vertical support on which the first robot arm structure 3 is mounted. Each robot arm structure is provided with a single electrode tip instead of paired electrode tips. Cable 61 connects a first terminal of the transformer T to the electrode tip 60 of the robot arm 3 and cable 61' connects a second terminal of the transformer T to the electrode tip 60' of the robot arm structure 3'. Therefore, welding current is passed between the electrode tips 3 and 3' through the workpiece F and the backing electrode 88 or 89, so that spot weld is accomplished simultaneously in any two locations as illustrated in solid and phantom lines in FIG. 14.

Figure 15:
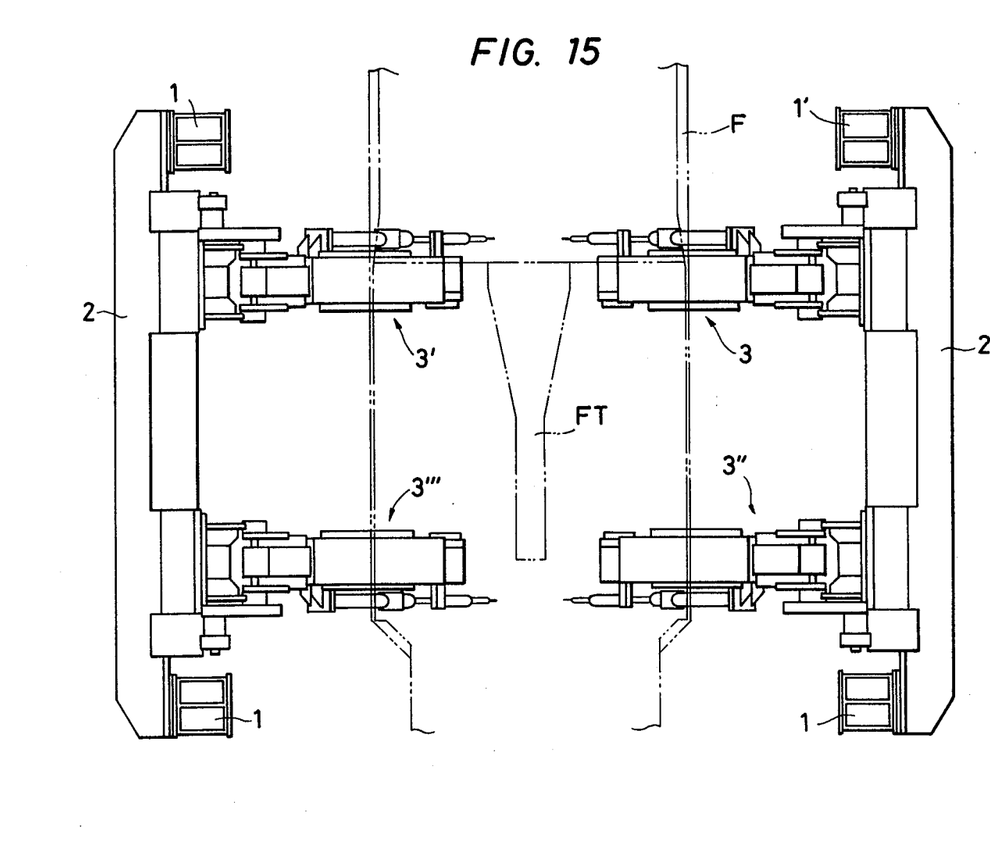
FIG. 15 is a plan view of FIG. 14.

Another pair of spot welding machines 3" and 3'" may also be employed as shown in FIG. 15 to achieve simultaneous spot welding operations in which welding current is passed between the electrode tips of these welding machines in the same manner as described in FIG. 14.

What is claimed is:

1. A spot welding machine comprising:
   a pair of vertically spaced-apart parallel upper and lower guide rails;
   means for supporting said guide rails a distance from the ground;
   a slide member slidably mounted on said guide rails;
   means for moving said slide member along said guide rails;
   a first electrode tip electrically connected to a current source;
   a robot arm structure having a housing pivotally mounted at a rearward end thereof on an upper pivot point of said slide member adjacent to said upper guide rail, an outer cylindrical shaft mounted movably in said housing along the longitudinal axis thereof, an inner shaft mounted in said outer shaft and rotatable about said longitudinal axis and axially movable with said outer shaft, first fluid operated telescopic means secured to said housing for axially moving said outer and inner shafts, second fluid operated telescopic means for rotating said inner shaft, and an electrode holder for holding said first electrode tip, said holder being axially movable with the axial movement of said outer and inner shafts and vertically swingable with the rotation of said inner shaft;
   third fluid operated telescopic means pivotally connected between a lower pivot point of said slide member of said housing for pivoting said robot arm structure at a desired angular position on a vertical plane; and
   a backing electrode disposed on the ground on which a workpiece is mounted to receive an electric current supplied from said first electrode tip.

2. A spot welding machine as claimed in claim 1, wherein said housing includes a pair of opposed first slide members secured to the housing, and wherein said outer shaft includes a pair of second slide members respectively in abutment contact with said first slide members.

3. A spot welding machine as claimed in claim 1, wherein said supporting means comprises a framed structure having a pair of first and second vertical supports secured at one end to the ground and a horizontal beam extending between the other ends of said vertical supports to define a working area in which a workpiece is to be placed.

4. A spot welding machine as claimed in claim 3, wherein said first robot arm structure is mounted on said first vertical support and the said first electrode tip is connected to a first terminal of said current source, further comprising a second robot arm structure identical to said first robot arm structure and mounted on said second vertical support, and a second electrode tip held by the electrode holder of said second robot arm structure and electrically connected to a second terminal of said current source to pass current between said first and second electrode tips through said workpiece and said backing electrode.

5. A spot welding machine as claimed in claim 1, further comprising a second electrode tip mounted parallel with said first electrode tip on said electrode holder, wherein said first electrode tip is connected to a first terminal of said current source and said second electrode tip is connected to a second terminal of said current source to pass current between said first and second electrode tips through the workpiece and said backing electrode.

6. A spot welding machine as claimed in claim 5 or 4, wherein said backing electrode comprises a plurality of angularly spaced-apart metal members each having a particular edge contour in conformity with the lower surface contour of a particular workpiece, said metal members being mounted on a horizontal rotary shaft, and fluid operated telescopic means for rotating said shaft to move one of said metal members to an upright position.

7. A spot welding machine as claimed in claim 1 or 5, further comprising means for applying a brake to said electrode holder.

* * * * *